US012785800B2

(12) United States Patent
Zhao et al.

(10) Patent No.: US 12,785,800 B2
(45) Date of Patent: Nov. 3, 2026

(54) METHOD AND APPARATUS FOR SENDING FAULT ALARM INFORMATION

(71) Applicant: Huawei Technologies Co., Ltd., Shenzhen (CN)

(72) Inventors: Chen Zhao, Wuhan (CN); Xiang Cheng, Wuhan (CN); Huan Le, Shenzhen (CN); Tao Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 18/660,495

(22) Filed: May 10, 2024

(65) Prior Publication Data

US 2024/0291561 A1 Aug. 29, 2024

Related U.S. Application Data

(63) Continuation of application No. PCT/CN2021/130005, filed on Nov. 11, 2021.

(51) Int. Cl.
*H04B 10/077* (2013.01)

(52) U.S. Cl.
CPC ................................ *H04B 10/0771* (2013.01)

(58) Field of Classification Search
CPC ................. H04B 10/0771; H04B 10/40; H04J 2203/006; H04J 3/14; H04L 41/0686; H04L 41/5022
See application file for complete search history.

(56) References Cited

U.S. PATENT DOCUMENTS 6,707,795 B1 * 3/2004 Noorhosseini ...... H04L 41/0631 370/242
7,043,661 B2 * 5/2006 Valadarsky ......... H04L 41/0604 702/59
7,143,161 B2 * 11/2006 Brissette ................ H04L 43/00 370/242
9,071,361 B2 * 6/2015 Ding ................... H04J 14/0282
9,071,456 B2 * 6/2015 Yan ...................... H04B 10/032
(Continued)

FOREIGN PATENT DOCUMENTS

EP 1411665 A1 * 4/2004 .......... H04J 14/0295
WO WO-2016025024 A1 * 2/2016 ............ H04L 41/22

OTHER PUBLICATIONS

ITU-T, G.709/Y.1331, "Series G: Transmission Systems and Media, Digital Systems and Networks, Digital terminal equipments—General, Series Y: Global Information Infrastructure, Internet Protocol Aspects, Next-Generation Networks, Internet of Things and Smart Cities, Internet protocol aspects—Transport, Interfaces for the optical transport network," Jun. 2020, 280 pages.
(Continued)

*Primary Examiner* — David C Payne
*Assistant Examiner* — Mohammed Abdelraheem
(74) *Attorney, Agent, or Firm* — Conley Rose, P.C.

(57) ABSTRACT

A method includes: generating fault alarm information, and sending the fault alarm information through a serializer/deserializer (SerDes) bus. The fault alarm information indicates a fault that occurs in a first apparatus and/or a target communication link, and the target communication link is a link for communication between the first apparatus and a second apparatus.

20 Claims, 9 Drawing Sheets

(56) References Cited

U.S. PATENT DOCUMENTS

| | | | | |
|---|---|---|---|---|
| 2002/0111755 | A1* | 8/2002 | Valadarsky | H04L 41/065 702/58 |
| 2003/0120799 | A1* | 6/2003 | Lahav | H04J 3/1611 709/236 |
| 2011/0119530 | A1* | 5/2011 | Lazzaro | G06F 11/008 714/39 |
| 2016/0043797 | A1* | 2/2016 | Sareen | H04Q 11/0005 398/5 |
| 2016/0337031 | A1* | 11/2016 | Hironaka | H04B 10/032 |

OTHER PUBLICATIONS

ITU-T, G.798, "Series G: Transmission Systems and Media,, Digital Systems and Networks, Digital terminal equipments—Other terminal equipment, Characteristics of optical transport network hierarchy equipment functional blocks," Dec. 2012, 390 pages.

* cited by examiner

| Mapping layer=ODUk/ ODUC | Section layer=SM, PM, TCM 1 to TCM 6, OPU (where this field is not available for non-OTN alarms) | Data (where 0 indicates that there is no fault alarm, and 1 indicates that there is a fault alarm) | | | | | | | | | | | | | | | | | | | | | |
|---|---|---|---|---|---|---|---|---|---|---|---|---|---|---|---|---|---|---|---|---|---|---|---|
| ODUC | SM/PM/TCM 1 to TCM 6/ OPU | AIS | OCI | LCK | TIM | SSF | DEG | LOF | LOM | LOFLOM | LOOMFI | LTC | BDI | PLM | MSIM | LOL | TSF | CSF | MSI | PT | TTI |
| ODUk | PM/TCM 1 to TCM 6/OPU | AIS | OCI | LCK | TIM | SSF | DEG | LOF | LOM | LOFLOM | LOOMFI | LTC | BDI | PLM | MSIM | LOL | TSF | CSF | MSI | PT | TTI |

FIG.7

METHOD AND APPARATUS FOR SENDING FAULT ALARM INFORMATION

CROSS-REFERENCE TO RELATED APPLICATIONS

This is a continuation of International Patent Application No. PCT/CN2021/130005 filed on Nov. 11, 2021, which is hereby incorporated by reference in its entirety.

TECHNICAL FIELD

This disclosure relates to the field of digital communication and optical communication, and in particular, to a method and an apparatus for sending fault alarm information.

BACKGROUND

A digital coherent optics (DCO) module is a processing module that integrates optical-to-electrical conversion and transmission functions. The DCO module usually includes highly integrated optical coherent receivers and transmitters using tunable lasers. Many elements of the DCO module usually need to be fabricated by using advanced technologies such as silicon photonics. The DCO module may be deployed on various communication apparatuses or signal processing apparatuses (such as a switch, a router, and a board), and implement the optical-to-electrical conversion and transmission functions. A digital signal processor (DSP) chip is integrated into an optical component, so that the DCO module may implement digital communication with an apparatus in which the DCO module is located.

After the DCO module is deployed on an apparatus, a fault that occurs in the apparatus may be sensed in time, but the DCO module cannot perform corresponding processing on the sensed fault to eliminate the fault. Therefore, after sensing the fault that occurs in the apparatus, the DCO module needs to report alarm information for the fault to an upper-layer module or another module that can perform corresponding processing on the fault.

The DCO module can report fault alarm information through a specific interruption pin in the DCO module. However, a quantity of interruption pins in the DCO module is limited, and there are fewer interruption pins that can be used to transmit the fault alarm information. In addition, the DCO module can sense a large quantity of types of faults. Therefore, the specific interruption pin in the DCO module may not be able to report a plurality of types of fault alarm information at the same time, and it is difficult to meet a requirement of reporting the fault alarm information fast and in a timely manner during actual application.

SUMMARY

This disclosure provides a method and an apparatus for sending fault alarm information, to improve a speed of sending the fault alarm information by an optical module, and implement fast and timely reporting of the fault alarm information.

According to a first aspect, an embodiment of this disclosure provides a method for sending fault alarm information, which is applied to an optical module. The optical module is located in a first apparatus. The method includes generating fault alarm information, and sending the fault alarm information through a serializer/deserializer (SerDes) bus. The fault alarm information indicates a fault that occurs in the first apparatus and/or a target communication link, and the target communication link is a link for communication between the first apparatus and another apparatus.

In this method, the SerDes bus is an optical transport network (OTN) overhead control channel of the optical module, a transmission rate and transmission bandwidth of the SerDes bus are both large, and a corresponding capacity of information that can be borne is also large. In addition, during actual application, bandwidth occupied by the SerDes bus usually has a large margin. This can meet a resource requirement for sending a plurality of types of fault alarm information at the same time. Therefore, in this method, the optical module sends the fault alarm information through an existing SerDes bus, so that a large bandwidth margin of the SerDes bus can be used to implement fast sending of a plurality of types of fault alarm information at the same time. This improves a speed and efficiency of performing fault alarm by the optical module.

In this method, in a possible design, sending the fault alarm information through a SerDes bus includes sending, through the SerDes bus, an OTN overhead signal that carries the fault alarm information.

In this method, the fault alarm information is carried in the OTN overhead signal for transmission, and the fault alarm information may be transmitted in a transmission manner of an existing signal. This reduces extra overheads and impact caused by sending the fault alarm information as much as possible.

In a possible design, the OTN overhead signal further includes overhead information and first identification information, or overhead information, first identification information, and second identification information. The overhead information is used to monitor a service signal of a service carried by the first apparatus and/or the target communication link, the first identification information identifies the fault alarm information, and the second identification information identifies the overhead information.

In this method, the fault alarm information is identified by using the first identification information, so that a receiving end of the OTN overhead signal can locate and extract the fault alarm information from the OTN overhead signal more quickly. This accelerates processing of the fault alarm information by the receiving end. Further, the first identification information and the second identification information separately identify the fault alarm information and other information than the fault alarm information, namely, the overhead information, so that the fault alarm information and the other information can be more accurately distinguished, and it is more convenient for the receiving end to separately process the fault alarm information and the other information.

In a possible design, generating fault alarm information includes determining the fault that occurs in the first apparatus and/or the target communication link, and generating the fault alarm information based on the determined fault, where a type of the fault alarm information is the same as a type of the determined fault.

In a possible design, determining the fault that occurs in the first apparatus and/or the target communication link includes obtaining a target service classification tree, where the target service classification tree indicates a service level of each target service in a plurality of target services, and an upper-level and lower-level association relationship between target services of different service levels, the plurality of target services are services carried by the first apparatus and the target communication link, and in the target service classification tree, each target service has one upper-level service and/or at least one lower-level service, detecting a faulty service based on the target service classification tree, and determining, based on the faulty service, the fault that occurs in the first apparatus and/or the target communication link.

In the method, the target service classification tree may intuitively reflect service levels of the target services carried by the first apparatus and the target communication link and an upper-level and lower-level association relationship between services. Fault detection may be performed on some target services in a targeted manner based on the service levels of the target services and the upper-level and lower-level association relationship between the services. Therefore, after the target service is classified into levels by using the target service classification tree, it is more convenient to perform the fault detection and subsequent processing on the target service.

In a possible design, detecting a faulty service based on the target service classification tree includes selecting, from the target service classification tree, a target service with a highest service level as a to-be-detected service, sequentially detecting, in descending order of service levels, the to-be-detected service and all target services that have a lower-level association relationship with the to-be-detected service, each time a faulty service is detected, saving the faulty service, and stopping detecting all target services that have a lower-level association relationship with the faulty service, and after detection of all the target services that have the lower-level association relationship with the to-be-detected service is completed, selecting, from the target service classification tree, a next target service with a highest service level as a to-be-detected service to continue detection until detection of the last target service with a highest service level is completed.

In the method, the target service indicated by the target service classification tree is detected based on a service level sequence indicated by the target service classification tree, so that an order of the service detection can be improved. In addition, each time a faulty service is detected, detection of a service that has a lower-level association relationship with the service is stopped, so that redundant detection on some target services can be avoided, and a detection speed is improved while detection accuracy is ensured.

In a possible design, when the faulty service is a target service, the fault alarm information includes at least one piece of fault indication information. The at least one piece of fault indication information indicates the target service.

In the method, the fault indication information in the fault alarm information may separately indicate different service faults. Therefore, the fault alarm information may indicate a plurality of different service faults at the same time, and efficiency of sending a fault alarm can be ensured when a large quantity of service faults occur.

According to a second aspect, an embodiment of this disclosure provides an apparatus. The apparatus is used in an optical module, and the optical module is located in a first apparatus. The apparatus includes a processing unit configured to generate fault alarm information, and a sending unit configured to send the fault alarm information through a SerDes bus. The fault alarm information indicates a fault that occurs in the first apparatus and/or a target communication link, and the target communication link is a link for communication between the first apparatus and another apparatus.

In a possible design, when sending the fault alarm information through the SerDes bus, the sending unit is configured to send, through the SerDes bus, an OTN overhead signal that carries the fault alarm information.

In a possible design, the OTN overhead signal further includes overhead information and first identification information, or overhead information, first identification information, and second identification information. The overhead information is used to monitor a service signal of a service carried by the first apparatus and/or the target communication link, the first identification information identifies the fault alarm information, and the second identification information identifies the overhead information.

In a possible design, when generating the fault alarm information, the processing unit is further configured to determine the fault that occurs in the first apparatus and/or the target communication link, and generate the fault alarm information based on the determined fault, where a type of the fault alarm information is the same as a type of the determined fault.

In a possible design, when determining the fault that occurs in the first apparatus and/or the target communication link, the processing unit is further configured to obtain a target service classification tree, where the target service classification tree indicates a service level of each target service in a plurality of target services and an upper-level and lower-level association relationship between target services of different service levels, the plurality of target services are services carried by the first apparatus and the target communication link, and in the target service classification tree, each target service has one upper-level service and/or at least one lower-level service, detect a faulty service based on the target service classification tree, and determine, based on the faulty service, the fault that occurs in the first apparatus and/or the target communication link.

In a possible design, when detecting the faulty service based on the target service classification tree, the processing unit is further configured to select, from the target service classification tree, a target service with a highest service level as a to-be-detected service, sequentially detect, in descending order of service levels, the to-be-detected service and all target services that have a lower-level association relationship with the to-be-detected service, each time a faulty service is detected, save the faulty service, and stop detecting all target services that have a lower-level association relationship with the faulty service, and after detection of all the target services that have the lower-level association relationship with the to-be-detected service is completed, select, from the target service classification tree, a next target service with a highest service level as a to-be-detected service to continue detection until detection of the last target service with a highest service level is completed.

In a possible design, when the faulty service is a target service, the fault alarm information includes at least one piece of fault indication information. The at least one piece of fault indication information indicates the target service.

According to a third aspect, this disclosure provides a chip, including a transceiver, a memory, and a processor. The transceiver is configured to receive a signal from an apparatus other than the chip, and transmit the signal to the processor, or send a signal from the processor to an apparatus other than the chip. The memory is configured to store a program. The processor is configured to execute the program stored in the memory, to implement the method described in any one of the first aspect or the possible designs of the first aspect.

According to a fourth aspect, this disclosure provides an electronic device, where the electronic device includes the chip according to the third aspect.

According to a fifth aspect, this disclosure provides an electronic device, where the electronic device includes an optical module, and the optical module includes the chip according to the third aspect.

According to a sixth aspect, this disclosure further provides a computer-readable storage medium, where the computer-readable storage medium includes a computer program. When the computer program is run on a computer, the computer is enabled to perform the method described in any one of the first aspect or the possible designs of the first aspect.

According to a seventh aspect, this disclosure provides a computer program product, where the computer program product includes a computer program or instructions. When the computer program or the instructions are run on a computer, the computer is enabled to perform the method described in any one of the first aspect or the possible designs of the first aspect.

For beneficial effects of the second aspect to the seventh aspect, refer to the description of the beneficial effects of the first aspect. Details are not described herein again.

BRIEF DESCRIPTION OF DRAWINGS

FIG. 7 is a schematic diagram of composition of a data frame of fault alarm information according to an embodiment of this disclosure;

DESCRIPTION OF EMBODIMENTS

Figure 1:
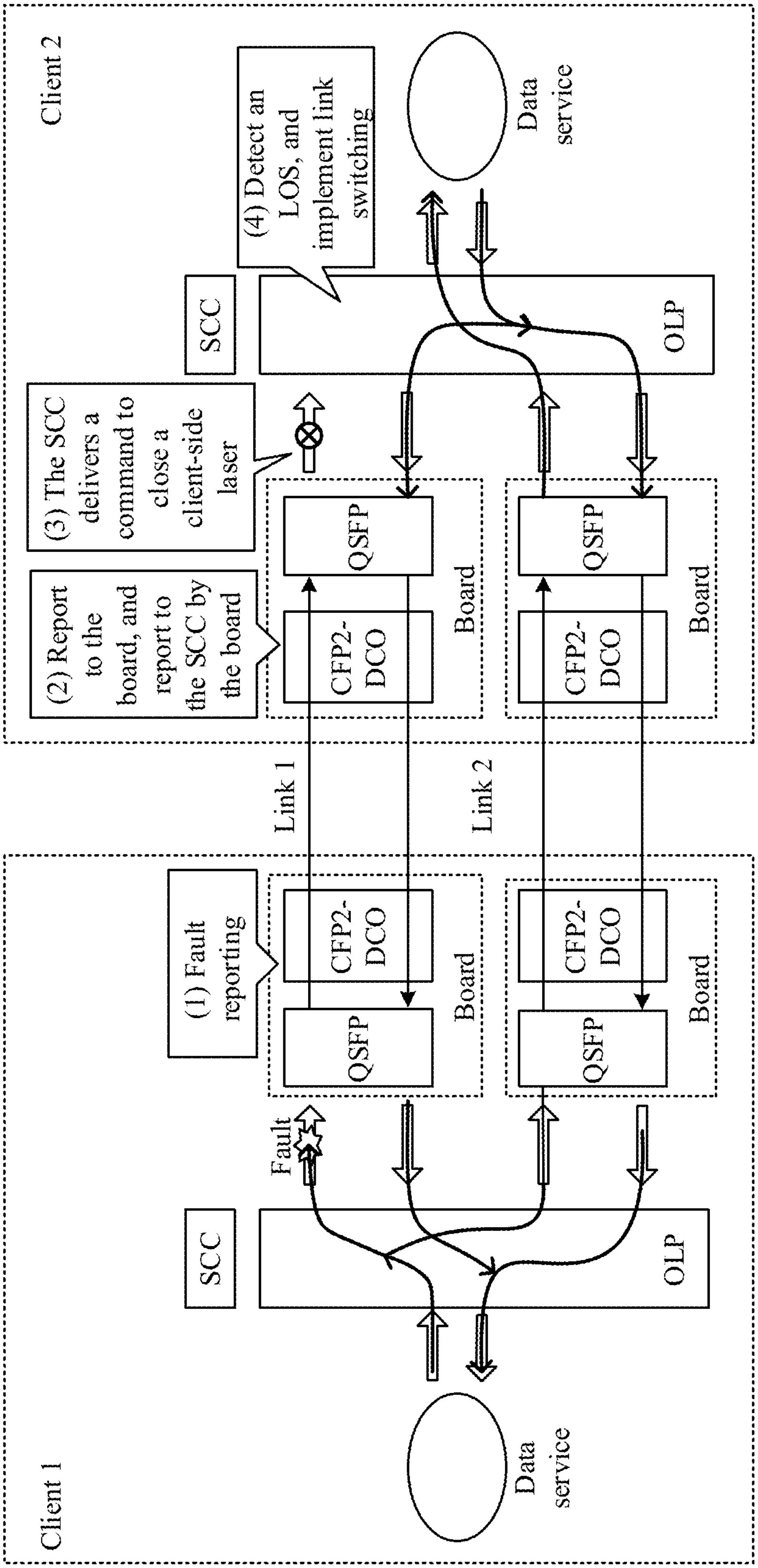
FIG. 1 is a schematic diagram of a process of client-side fiber cut protection.

To make objectives, technical solutions, and advantages of embodiments of this disclosure clearer, the following further describes embodiments of this disclosure in detail with reference to the accompanying drawings. The terms "first" and "second" below in descriptions of embodiments of this disclosure are merely used for a description purpose, and shall not be understood as an indication or implication of relative importance or implicit indication of a quantity of indicated technical features. Therefore, a feature limited by "first" or "second" may explicitly or implicitly include one or more features.

For ease of understanding, descriptions of concepts related to this disclosure are provided as examples for reference, as shown in the following:

(1) An OTN is a network formed by a series of network units connected by optical fibers, and is a transport network that implements transmission, multiplexing, route selection, management, and monitoring of service signals in an optical domain.

One of the main features of the OTN is network hierarchy. The OTN includes a plurality of network layers, and each network layer is a server layer and a client layer for each other. Signals may be transmitted between different network layers. Each network layer has an overhead, and the overhead may be used to detect signal quality at the network layer.

According to OTN-related protocols (such as a G.709 protocol), the OTN may be divided into a client signal layer, an optical payload unit (OPU), an optical data unit (ODU), an optical transport unit (OTU), an optical channel layer (OCH), an optical multiplex section layer (OMS), an optical transport section layer (OTS), and the like.

An OTN data frame may be used to carry various service data in the OTN, and can implement management and monitoring of the service data. The OTN data frame may be an optical data unit k (ODUk), an n×100 gigabits per second (Gbps) ODU (ODUCn), or a flexible ODU (ODUflex), or the OTN data frame may be an optical transport unit k (OTUk), an OTUCn, a flexible OTN (FlexO), or the like. A difference between an ODU frame and an OTU frame lies in that the OTU frame includes an ODU frame and an OTU overhead. k represents different rate levels. For example, k=1 represents 2.5 Gbps, and k=4 represents 100 Gbps. Cn represents a variable rate, and may be a rate that is a positive integer multiple of 100 Gbps. For example, ODUC4 represents an optical data unit with a transmission rate of 400 Gbps.

The OTN data frame usually includes an overhead area and a payload area. The overhead area is used to carry overhead information of a network layer, for example, a service frame header indication, a path trace identifier, an X-bit interleaved parity (BIP-X) check, a backward error indication (BEI), a backward defect indication (BDI), a status (STAT), a timestamp, a sequence identifier, and a mapping overhead. The payload area is used to carry service data. In some special cases, the OTN data frame may not include a payload area, that is, the OTN data frame is not used to carry service data. In this case, the OTN data frame is referred to as an OTN overhead data frame. OTN overhead information is transmitted between network layers in the form of OTN overhead data frames.

It should be noted that the OTN data frame may also be another frame structure applicable to an optical network, and with development of an OTN technology, a new type of OTN frame may be defined, which is also applicable to this disclosure.

(2) SerDes is a mainstream time-division multiplexing (TDM) and peer-to-peer (P2P) serial communication technology. That is, a transmitting end converts a plurality of low-speed parallel signals into high-speed serial signals, and transmits the high-speed serial signals to a receiving end through a transmission medium (such as an optical cable), and the receiving end converts the high-speed serial signals into low-speed parallel signals again. Such a peer-to-peer serial communication technology uses a channel capacity of the transmission medium, reduces quantities of required transmission channels and component pins, improves a signal transmission rate, and greatly reduces communication costs.

It should be understood that, in embodiments of this disclosure, "at least one" means one or more, and "a plurality of" means two or more. The term "and/or" describes an association relationship between associated objects, and indicates that three relationships may exist. For example, A and/or B may indicate the following cases: only A exists, both A and B exist, and only B exists, where A and B may be singular or plural. The character "/" generally indicates an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

A 100 G form-factor pluggable (CFP) protocol defines a package specification for hot-swappable optical modules. It is a new type of high-speed hot-swappable optical module standard that supports two applications of data communication and telecommunication transmission. The DCO module encapsulated based on the CFP protocol may support a transmission rate such as 100 Gbps (or 100 G), 400 Gbps (400 G), or 800 Gbps (800 G), and can meet a requirement of a wide range of network optical interconnection applications.

For example, a DCO (or CFP2-DCO) module based on a second generation CFP protocol may be widely applied to a data center inter-connect (DCI) scenario. In a DCI scenario, when a service fault occurs on a client, a service needs to be quickly restored, to maintain normal execution of the service on the client. For example, as shown in FIG. 1, initially, two clients communicate with each other through a link 1. When a fiber cut fault occurs on one of the clients, communication performed by the two clients based on the link 1 is affected. Therefore, a system control communication (SCC) board needs to be used to switch communication links of the two clients from the link 1 to a link 2, to ensure normal communication between the two clients. However, the SCC board does not have a fault detection function, but the CFP2-DCO module has the fault detection function. Therefore, the CFP2-DCO module needs to be able to quickly report fault alarms to the SCC board, so that the SCC board can respond to the fault alarms and rectify service faults. The fault alarms need to be reported as quickly as possible to reduce impact on service recovery time.

For example, as shown in FIG. 1, when a service fault occurs on a client 1, a CFP2-DCO module in the client 1 reports the service fault to a client 2 through a link 1, and after receiving the service fault reported by the client 1, a CFP2-DCO module in the client 2 reports an alarm corresponding to the service fault to an SCC board, so that the SCC board may actively turn off a laser on a side of the client 2, and trigger an optical fiber line auto switch protection equipment (OLP) to perform path switching. Therefore, the client 1 and the client 2 are switched to communicate through the link 2, and normal execution of the client service is restored.

The CFP2-DCO module can report alarms to the SCC board through specific interruption pins in the CFP2-DCO module.

Figure 2:
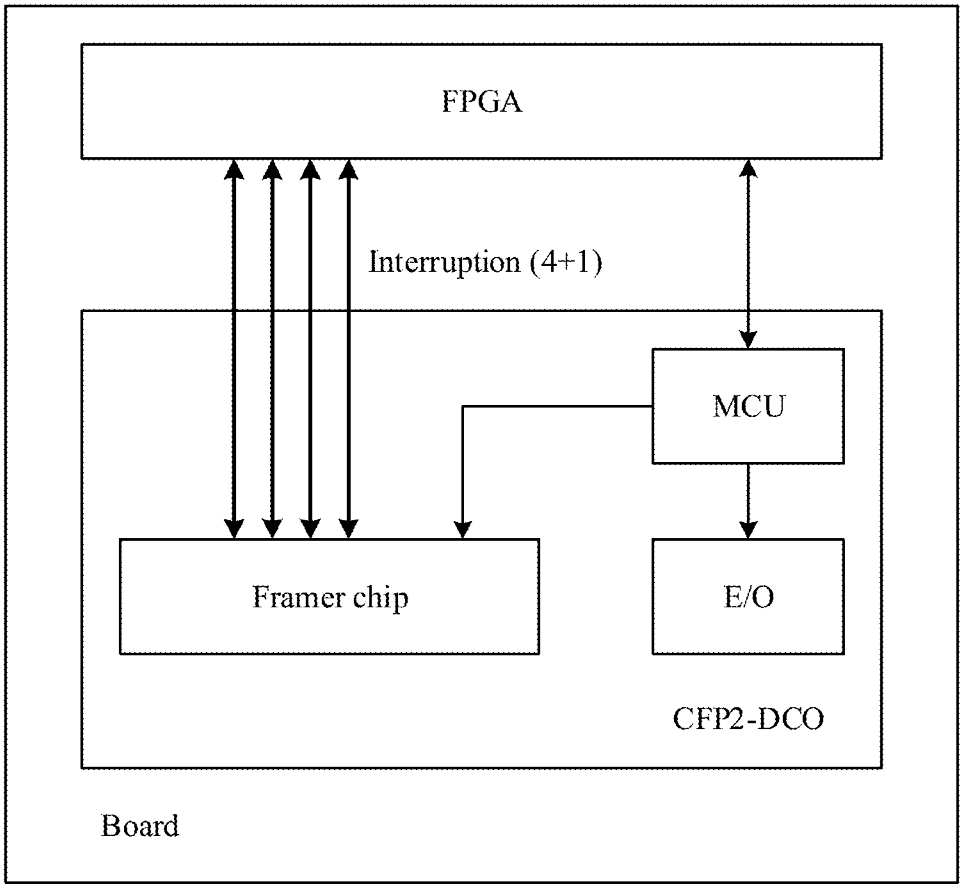
FIG. 2 is a schematic diagram of a system architecture of a DCO module.

As shown in FIG. 2, the CFP2-DCO module includes a framer chip, and the framer chip is configured to report fault alarms. The framer chip may provide a plurality of interruption reporting pins (16 or more, depending on a capability of the framer chip) for reporting fault alarms. When the CFP2-DCO module provides a transmission rate of 400 G, the CFP2-DCO module has a maximum of four 100 Gigabit Ethernet (GE) client-side services. 1 GE=1 Gbps. On a line side, there is one ODUC4 channel. Due to limitation of 104 pin resources, the CFP2-DCO module selects only five interruption pins (as shown in FIG. 2) as interruption reporting pins to report fault alarms.

In this manner, the framer chip includes 104 pins in total, and all the five self-defined interruption pins are occupied. Therefore, scalability of the interruption reporting pin is poor. For example, when the CFP2-DCO module provides a transmission rate of 800 G, the CFP2-DCO module has a maximum of eight 100 GE client-side services. In this case, the interruption reporting pins are insufficient, and it is difficult to quickly report fault alarms in a timely manner.

Figure 3:
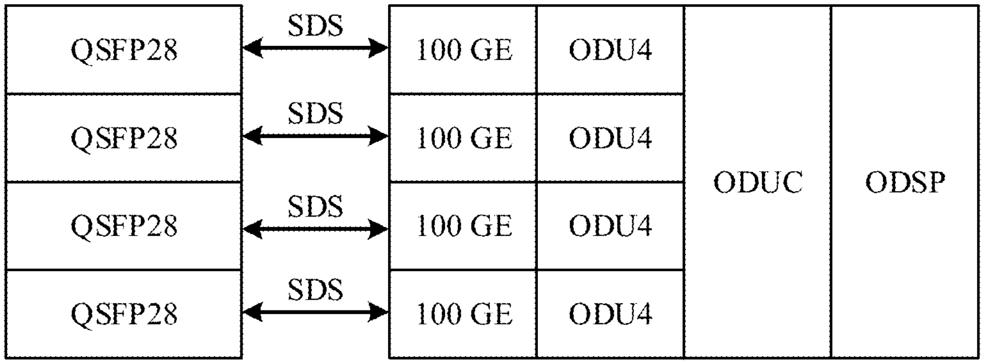
FIG. 3 is a schematic diagram of service flow transmission.

In addition, a client-side service has multi-level mapping. For example, as shown in FIG. 3, in a transmission process, service data undergoes multi-level processing of modules such as a 100 GE, an optical data unit (ODU4), an ODUC, and an optical DSP (ODSP), and transmission of a quad small form-factor pluggable (QSFP) or a SerDes bus. A fault may occur in a service data processing or transmission process of each module. However, due to limitation on a quantity of interruption reporting pins, only the fault alarms of client-side services and the ODUC can be reported in the preceding mode. For the fault alarms of the mapped ODU4, no more interruption pin resources can be reported.

In this manner, a quantity of fault alarms that can be reported by the CFP2-DCO module depends on an interruption pin resource provided by the framer chip. If the CFP2-DCO module reports fault alarms for all services that may be faulty, a resource limit of the interruption reporting pin is exceeded. However, the CFP2-DCO module can report a large quantity of fault alarms, and a maximum quantity of layers of multi-level mapping of client-side services is greater than the four layers shown in FIG. 3. Therefore, the reporting of fault alarms is affected by a quantity of interruption pins of the framer chip, and it is difficult to meet requirements for reporting complex alarm combinations and fast and timely reporting of fault alarm information.

In view of this, embodiments of this disclosure provide a method for sending fault alarm information, to improve a speed of sending fault alarm information by an optical module, and implement fast and timely reporting of a fault alarm.

In some embodiments of this disclosure, the optical module is an optical module having a frame processing function. For example, the optical module may be an optical module including a framer chip, for example, a coherent optical module.

In the following embodiments, an example in which the solutions provided in this disclosure are used in the DCO module is used to describe the method provided in embodiments of this disclosure. However, it should be understood that the method provided in embodiments of this disclosure is not limited to being used in a coherent optical module, and may be further used in another optical module. This is not particularly limited in this embodiment of this disclosure.

Figure 4:
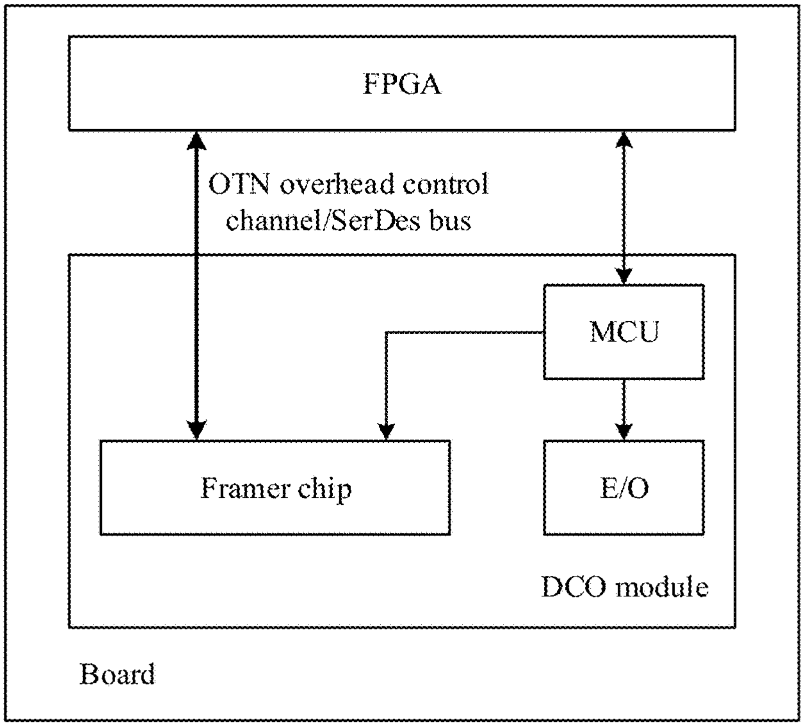
FIG. 4 is a schematic diagram of a system architecture of a board according to an embodiment of this disclosure.

FIG. 4 is a schematic diagram of a system architecture of a board according to an embodiment of this disclosure. As shown in FIG. 4, the board includes a DCO module and a field-programmable gate array (FPGA). The DCO module may be configured to implement optical communication between the board and another component or apparatus. As a processing center of the board, the FPGA may be configured to implement digital communication between the board and another component or apparatus.

Optionally, the FPGA in the board may be replaced with another device or apparatus having a digital signal processing function. This is not limited in this embodiment of this disclosure.

The DCO module includes a framer chip, a microcontroller unit (MCU), and an electro-optical conversion (E/O) unit. The framer chip is a chip that can perform data processing and that meets an optical communication standard or protocol (for example, a G.709 protocol and a G.798 protocol). The MCU is separately connected to and communicates with the FPGA, the framer chip, and the E/O unit. The MCU may be used to control the framer chip and the E/O unit. The E/O unit is mainly used to perform electro-optical conversion for signals. The framer chip may be connected to and communicate with the FPGA through its own pins or an OTN overhead control channel, namely, a SerDes bus. The framer chip may be configured to sense a fault that occurs in a DCO module, a board on which the DCO module is located, or an apparatus on which the board is located, and report corresponding fault alarm information to the FPGA, and then the FPGA reports the fault alarm information to an upper-layer module or another module that can perform corresponding processing on the fault.

In this embodiment of this disclosure, after sensing that a service fault occurs, the DCO module may quickly report fault alarm information through an existing SerDes bus and in a software encoding manner. This can flexibly meet a requirement for fast reporting complex and massive fault alarm information while saving a layout area and pin resources of the DCO module.

In the DCI scenario, the board may quickly control OTN overhead resources through the FPGA. The transmission rate of an OTN overhead serial port on the SerDes bus ranges from 3.125 Gbps to 6.25 Gbps. The bandwidth usage of the OTN overhead control has a large margin. Therefore, bandwidth resources of the SerDes bus are relatively sufficient.

In addition, compared with the bandwidth resources of the SerDes bus, the bandwidth occupied by the fault alarm information reported by the DCO module is extremely low. For example, transmission of a 400 GE service shown in FIG. 3 is used as an example. In a service flow transmission path based on 4×100 GE, 4×ODU4, and ODUC4, fault alarm information of one 100 GE service occupies eight bytes. One ODU4 service is divided into nine layers (which are respectively a section monitoring (SM) layer, a path monitoring (PM) layer, tandem connection monitoring (TCM) 1 to 6, and an OPU), and each layer occupies eight bytes. In this case, fault alarm information of one ODU4 service occupies 72 bytes, fault alarm information of one ODUC1 service and one ODU4 service both occupies 72 bytes, and the fault alarm information of one ODUC4 service and four ODUC1 services occupies the same bytes. Therefore, the fault alarm information involved in the service flow transmission path occupies 4×8+4×72+4×72=608 bytes in total. Based on the lowest transmission rate on the SerDes bus, namely, the bandwidth of 3.125 Gbps, the bandwidth usage for transmitting the fault alarm information is only 608×8/3.125 Gbps=1E-6 ($1\times10^{-6}$). Therefore, impact of the fault alarm information transmission on the SerDes bus bandwidth is small and can be ignored.

The following describes, with reference to specific embodiments, the method for sending fault alarm information provided in this embodiment of this disclosure.

The method for sending fault alarm information provided in this embodiment of this disclosure may be used in a DCO module, and the DCO module may be deployed in an apparatus or a device that supports digital communication and optical communication. For example, the method may be used in the DCO module in the board shown in FIG. 4, and a first apparatus may be the board or the client device on which the DCO module shown in FIG. 4 is located. Furthermore, the method for sending fault alarm information provided in this embodiment of this disclosure may be used in a framer chip in the DCO module.

Figure 5:
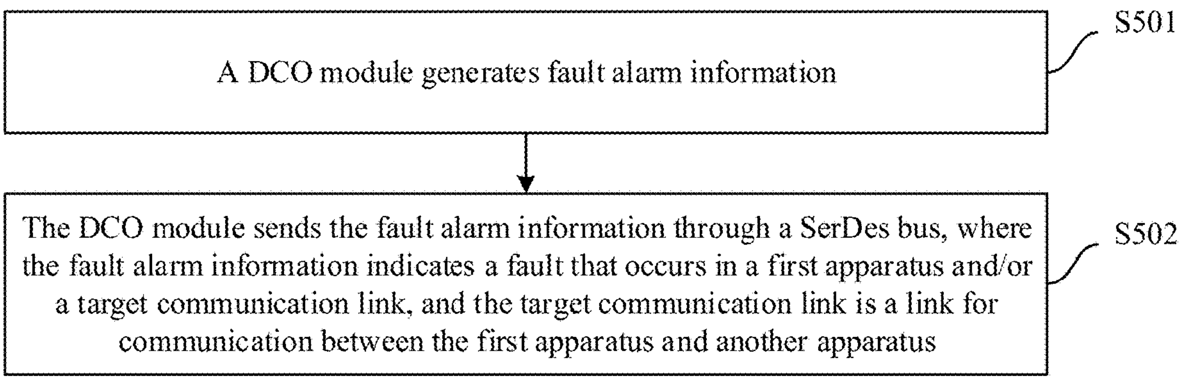
FIG. 5 is a schematic diagram of reporting fault alarm information according to an embodiment of this disclosure.

Refer to FIG. 5. An example in which the method provided in this embodiment of this disclosure is used in a DCO module in a first apparatus is used. The method for sending fault alarm information provided in this embodiment of this disclosure includes the following steps.

S501: The DCO module generates fault alarm information.

The DCO module may determine, based on a received signal, whether the first apparatus in which the DCO module is located or a link for communication between the first apparatus and another apparatus is faulty, and report fault alarm information. In some embodiments of this disclosure, when sensing that a fault occurs in the first apparatus (including a fault that occurs in the DCO module and a fault that occurs in a module other than the DCO module in the first apparatus) or sensing that a fault occurs in a target communication link (a link for communication between the first apparatus and another apparatus), the DCO module first needs to locate the fault and generate corresponding fault alarm information.

In some embodiments of this disclosure, when determining the fault that occurs in the first apparatus or the target communication link, the DCO module first obtains a target service classification tree. The target service classification tree indicates a service level of each target service in a plurality of target services, and an upper-level and lower-level association relationship between target services of different service levels. The plurality of target services are services carried by the first apparatus and the target communication link. In the target service classification tree, each target service has one upper-level service and/or at least one lower-level service.

The target service classification tree may be generated in advance by the DCO module based on the services carried by the first apparatus and the target communication link, and may be updated based on actual services carried by the first apparatus and the target communication link.

After obtaining the target service classification tree, the DCO module may query a faulty service level by level based on a service level relationship obtained through division by the target service classification tree, determine, based on the faulty service, a fault that occurs in the first apparatus and/or the target communication link, and generate corresponding fault alarm information.

Further, the DCO module may first select, from the target service classification tree, a target service with a highest service level as a to-be-detected service, then sequentially detect, in descending order of service levels, the to-be-detected service and all target services that have a lower-level association relationship with the to-be-detected service, and each time a faulty service is detected, save the faulty service, and stop detecting all target services that have a lower-level association relationship with the faulty service. After detection of all the target services that have the lower-level association relationship with the to-be-detected service is completed, the DCO module may continue to select, from remaining services in the target service classification tree, a next target service with a highest service level as a to-be-detected service to continue detection until detection of the last target service with a highest service level is completed. After the detection is completed, the DCO module may obtain all faulty services in the first apparatus and the target communication link.

A DCO module shown in FIG. 4 is used as an example. A framer chip in the DCO module may perform software-related control by using a software development kit (SDK). Initially, the SDK of the framer chip may generate a target service classification tree based on services in the DCO module. In the target service classification tree, the services in the DCO module may be classified into three levels: a level-1 service, a level-2 service, and a level-3 service. In this case, interruptions that occur in the corresponding services separately belong to a level-1 service interruption, a level-2 service interruption, and a level-3 service interruption. The level-1 service is an SDK service, namely, a service executed inside the SDK. When a fault occurs in the SDK, the service executed by the SDK is interrupted, and the SDK can sense the fault first. Therefore, the SDK service is a highest-level service, and an interruption of the SDK service is a highest-level interruption. The SDK service is a root node of the target service classification tree and is a convergence point of all faulty services in the DCO module. When querying the faulty service, the framer chip first queries whether the highest-level service interruption exists. In other words, the framer chip queries whether the SDK service is interrupted, to determine whether a fault occurs in the SDK. The level-2 service may include, for example, an XM layer (including an SM layer, a TCM layer, and a PM layer) service, a reserved for future international standardisation (RES) service, and a payload type (PT)-related service in an ODUC and an ODU4. The level-3 service may be a subservice obtained by further dividing each level-2 service, or may be a service associated with the level-2 service.

Figure 6:
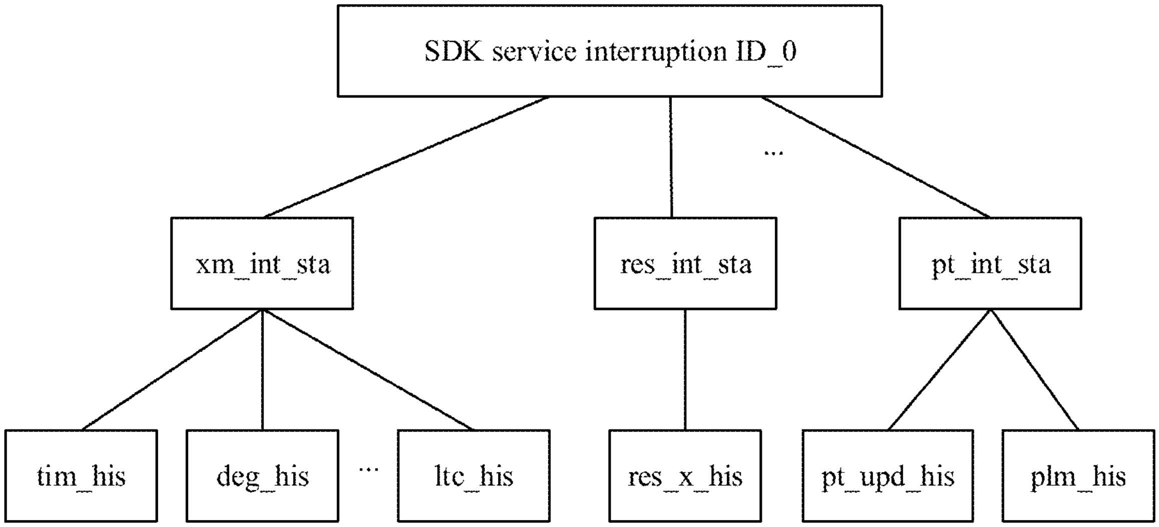
FIG. 6 is a schematic diagram of a service interruption alarm tree according to an embodiment of this disclosure.

For example, FIG. 6 is a schematic diagram of a service interruption alarm tree according to an embodiment of this disclosure. As shown in FIG. 6, the service interruption alarm tree corresponds to the target service classification tree, and indicates an interruption level at which each service in the target service classification tree is interrupted. The level-1 service interruption is the interruption of the SDK service and may be identified as ID_0. The level-2 service interruption includes an interruption of the XM layer service (which may be identified as xm_int_sta), an interruption of the RES service (which may be identified as res_int_sta, indicating an interruption of an RES overhead field in an OTN overhead), and an interruption of the PT-related service (which may be identified as pt_int_sta, indicating an interruption of a PT overhead byte). The interruption of the XM layer service may be further divided into a plurality of level-3 service interruptions, for example, a historical alarm interruption (which may be identified as tim_his) of a trail trace identifier mismatch (TIM) layer, a historical alarm interruption (which may be identified as deg_his) of signal degrade (DEG), and a historical alarm interruption (which may be identified as ltc_his) of a loss of tandem connection (LTC) shown in FIG. 6. The interruption of the RES section service may be further divided into a plurality of level-3 service interruptions, for example, an RES alarm interruption shown in FIG. 6, which may be identified as res_x_his. The OTN overhead has 11 RES bytes in total. A value of x is 1 to 11, indicating a specific RES byte in the 11 RES bytes. The interruption of the PT-related service may be further divided into a plurality of level-3 service interruptions, for example, a historical alarm interruption (which may be identified as pt_upd_his) of PT update and a historical alarm interruption (which may be identified as plm_his) of PT mismatch shown in FIG. 6.

After determining the occurred fault, the DCO module may generate fault alarm information based on the fault, where a type of the fault alarm information is the same as a type of the determined fault.

When the faulty service is the foregoing target service, the fault alarm information includes at least one piece of fault indication information, where the at least one piece of fault indication information indicates the target service or indicates whether the target service is faulty.

In some embodiments of this disclosure, the fault alarm information may further include layer indication information, and the layer indication information indicates a mapping layer to which a faulty service indicated by the at least one piece of fault indication information belongs.

For example, FIG. 7 is a schematic diagram of composition of a data frame of the fault alarm information according to an embodiment of this disclosure. For example, the fault indication information indicates the fault at the mapping layer of the ODUC and the ODU4 shown in FIG. 3. As shown in FIG. 7, the data frame of the fault alarm information may include a mapping layer field, a section layer field, and a fault indication information field. The mapping layer field indicates a mapping layer to which a faulty service belongs, and a value of the field is an identifier of the ODUC or an identifier of the ODU4. The section layer field indicates a section layer to which the faulty service belongs, and a value of the field may be an SM layer, a PM layer, TCM 1 to TCM 6, an OPU layer, or the like. The section layer is obtained through further division of the mapping layer. The fault indication information field indicates whether a specific service is faulty. For example, the fault indication information field may include a plurality of pieces of field information such as an alarm indication signal (AIS) field to a trail trace identifier (TTI) field shown in FIG. 7. Different values of the field indicate whether a corresponding fault occurs. For example, when a value of the AIS field is 1, it may indicate that a fault occurs in a service corresponding to the field, and when the value of the AIS field is 0, it indicates that no fault occurs in the service corresponding to the field. An indication manner of another field is the same as an indication manner of the AIS field, and details are not described herein again.

It should be noted that FIG. 7 shows only a data frame format of an OTN overhead signal corresponding to a network layer in the OTN. In different network layers, each network layer has its own OTN overhead signal. The OTN overhead signal of each network layer may be used to detect signal quality of the network layer.

S502: The DCO module sends the fault alarm information through a SerDes bus, where the fault alarm information indicates a fault that occurs in the first apparatus and/or the target communication link, and the target communication link is a link for communication between the first apparatus and another apparatus.

After generating the fault alarm information, the DCO module sends the fault alarm information through the SerDes bus. In an optional implementation, the DCO module may directly send the data frame of the fault alarm information on the SerDes bus. In another optional implementation, the DCO module may include the fault alarm information in an OTN overhead signal for sending, and the DCO module may send, through the SerDes bus, the OTN overhead signal carrying the fault alarm information, to send the fault alarm information.

The OTN overhead signal is used to monitor, manage, and maintain a signal transmitted in a communication process, to ensure quality of the transmitted signal. In this embodiment of this disclosure, a data frame of the OTN overhead signal may be formed in any one of the following manners:

Manner 1: The OTN overhead signal includes the fault alarm information and overhead information.

The overhead information is used to monitor a service signal of a service carried by the first apparatus and/or the target communication link.

Figure 8:
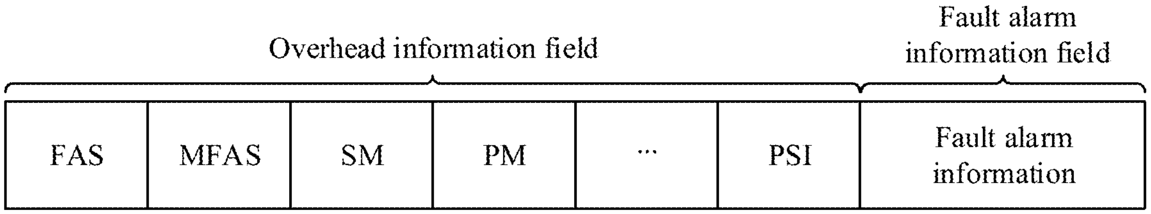
FIG. 8 is a schematic diagram of a data frame of an OTN signal according to an embodiment of this disclosure.

For example, FIG. 8 is a schematic diagram of a data frame of an OTN signal according to an embodiment of this disclosure. As shown in FIG. 8, the data frame of the OTN overhead signal includes a fault alarm information field and an overhead information field. The overhead information field is used to carry the overhead information, and the fault alarm information field is used to carry the fault alarm information. The overhead information includes content of an OTN overhead defined in a related standard or protocol (for example, the G.709 protocol or the G.798 protocol), for example, a plurality of signals such as a frame alignment signal (FAS), a multiframe alignment signal (MFAS), an SM, a PM, and a payload structure identifier (PSI) shown in FIG. 8.

For example, when the DCO module sends the fault alarm information to an FPGA, the FPGA may identify the overhead information and the fault alarm information in the OTN overhead signal, to determine, based on the identified fault alarm information, a fault alarm reported by the DCO module, and report the fault alarm to an upper-level module or another related module.

Manner 2: The OTN overhead signal includes the fault alarm information, overhead information, and first identification information. The first identification information identifies the fault alarm information.

Based on the composition of the data frame of the OTN signal provided in the manner 1, the data frame of the OTN overhead signal in this manner may further include a first identification information field. The first identification information field is used to carry the first identification information.

Figure 9:
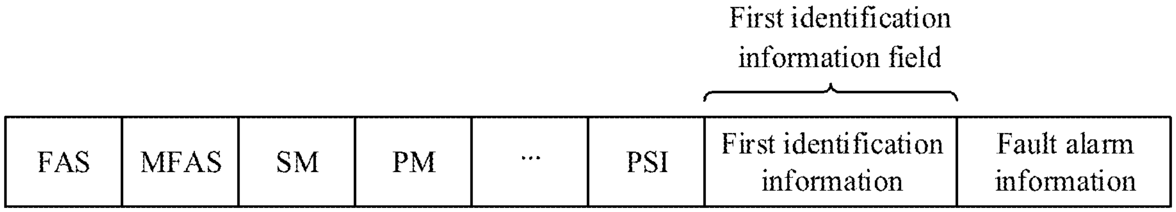
FIG. 9 is a schematic diagram of a data frame of another OTN signal according to an embodiment of this disclosure.

For example, FIG. 9 is a schematic diagram of a data frame of another OTN signal according to an embodiment of this disclosure. As shown in FIG. 9, the first identification information is located before the fault alarm information in the data frame, and the first identification information indicates that information after the first identification information is the fault alarm information. After the DCO module sends the OTN data frame to an FPGA, the FPGA may quickly locate and determine the fault alarm information based on the first identification information. This can further improve a speed of processing a fault alarm by the FPGA.

Manner 3: The OTN overhead signal includes the fault alarm information, overhead information, first identification information, and second identification information.

Based on the data frame of the OTN signal provided in the manner 2, the data frame of the OTN overhead signal in this manner may further include a second identification information field. The second identification information field is used to carry the second identification information.

In this manner, a quantity of second identification information fields included in the data frame may be the same as a quantity of information types included in the overhead information, and second identification information carried in each second identification information field may identify one type of overhead in the overhead information.

Figure 10:
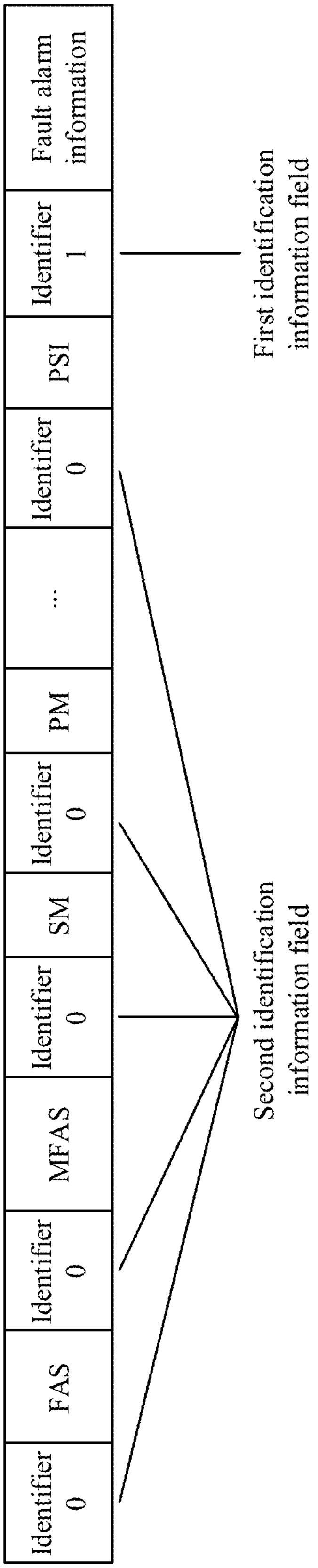
FIG. 10 is a schematic diagram of a data frame of still another OTN signal according to an embodiment of this disclosure.

For example, FIG. 10 is a schematic diagram of a data frame of still another OTN signal according to an embodiment of this disclosure. As shown in FIG. 10, in a plurality of signals from an FAS signal to a TTI signal, a field of the second identification information exists before a field of each signal to identify that the signal is the overhead information, and a field of the first identification information exists before a field of the fault alarm information to identify the fault alarm information. Therefore, the overhead information and the fault alarm information in the data frame can be further clearly distinguished.

In the foregoing manner, a value of the first identification information is different from a value of the second identification information, to distinguish the fault alarm information and the overhead information. For example, as shown in FIG. 10, a value of the first identification information may be an identifier 1, and a value of the second identification information may be an identifier 0.

It should be noted that, in the foregoing examples, an example in which the fault alarm information field in the data frame is located after the overhead information field is used for description. However, during actual implementation, location of the fault alarm information field in the data frame is not limited thereto. The fault alarm information field may also be located in another location in the data frame, for example, may be located before the overhead information field.

In some embodiments of this disclosure, after generating the data frame of the OTN signal, and before sending the data frame, the DCO module further needs to allocate a bandwidth resource that is on the SerDes bus and that is used to transmit the data frame. The bandwidth resource allocated for transmitting the data frame is greater than or equal to a bandwidth resource required for transmitting the OTN overhead signal. After the fault alarm information is added to an OTN signal, the bandwidth resource required for transmitting the OTN increases accordingly. Therefore, compared with a bandwidth resource allocated during OTN signal transmission in an existing solution, in the solution provided in this embodiment of this disclosure, a bandwidth resource that is on the SerDes bus and that is used to transmit the OTN signal needs to be added and allocated, and the added and allocated bandwidth resource needs to meet a requirement for reporting the fault alarm information.

In some embodiments of this disclosure, in addition to indicating the fault that occurs in the first apparatus and/or the target communication link, the fault indication information sent by the DCO module may further indicate a fault that occurs in a second apparatus communicating with the first apparatus. In this case, the fault indication information sent by the DCO module may be fault indication information received from the second apparatus. After receiving the fault indication information from the second apparatus, the DCO module sends the fault indication information through the SerDes bus.

For example, when the method provided in this embodiment of this disclosure is used in the system shown in FIG. 1, the DCO modules of the client 1 and the client 2 may detect, by using the method provided in this embodiment of this disclosure, a fault that occurs in the apparatuses in which the DCO modules are located or the communication links used by the DCO modules. When the first apparatus is the client 2 shown in FIG. 1 and the second apparatus is the client 1 shown in FIG. 1, the DCO module in the first apparatus may detect, by using the method provided in the foregoing embodiment of this disclosure, the fault that occurs in the first apparatus and/or the target communication link (which may be the communication link between the first apparatus and the second apparatus), and after generating corresponding fault alarm information, send the fault alarm information through the SerDes bus. In addition, the DCO module in the second apparatus may also detect a fault that occurs in the second apparatus and/or the target communication link, and generate corresponding fault alarm information. After generating the fault alarm information, the DCO module of the second apparatus may send the fault alarm information to the DCO module of the first apparatus, and the DCO module of the first apparatus may forward the fault alarm information through the SerDes bus.

In the foregoing embodiment, the SerDes bus is an OTN overhead control channel of the DCO module, and a transmission rate and transmission bandwidth of the SerDes bus are both large, and a corresponding capacity of information that can be borne is also large. In addition, during actual application, bandwidth occupied by the SerDes bus usually has a large margin. Therefore, the DCO module sends the fault alarm information through an existing SerDes bus, so that a large bandwidth margin of the SerDes bus can be used to quickly send a large quantity of fault alarm information. This improves a speed and efficiency of the DCO module in sending a fault alarm. In addition, the solution in the foregoing embodiment does not affect a hardware distribution integration level of the DCO module, and is more feasible.

The following describes, with reference to specific examples, the method for sending fault alarm information provided in embodiments of this disclosure.

Figure 11:
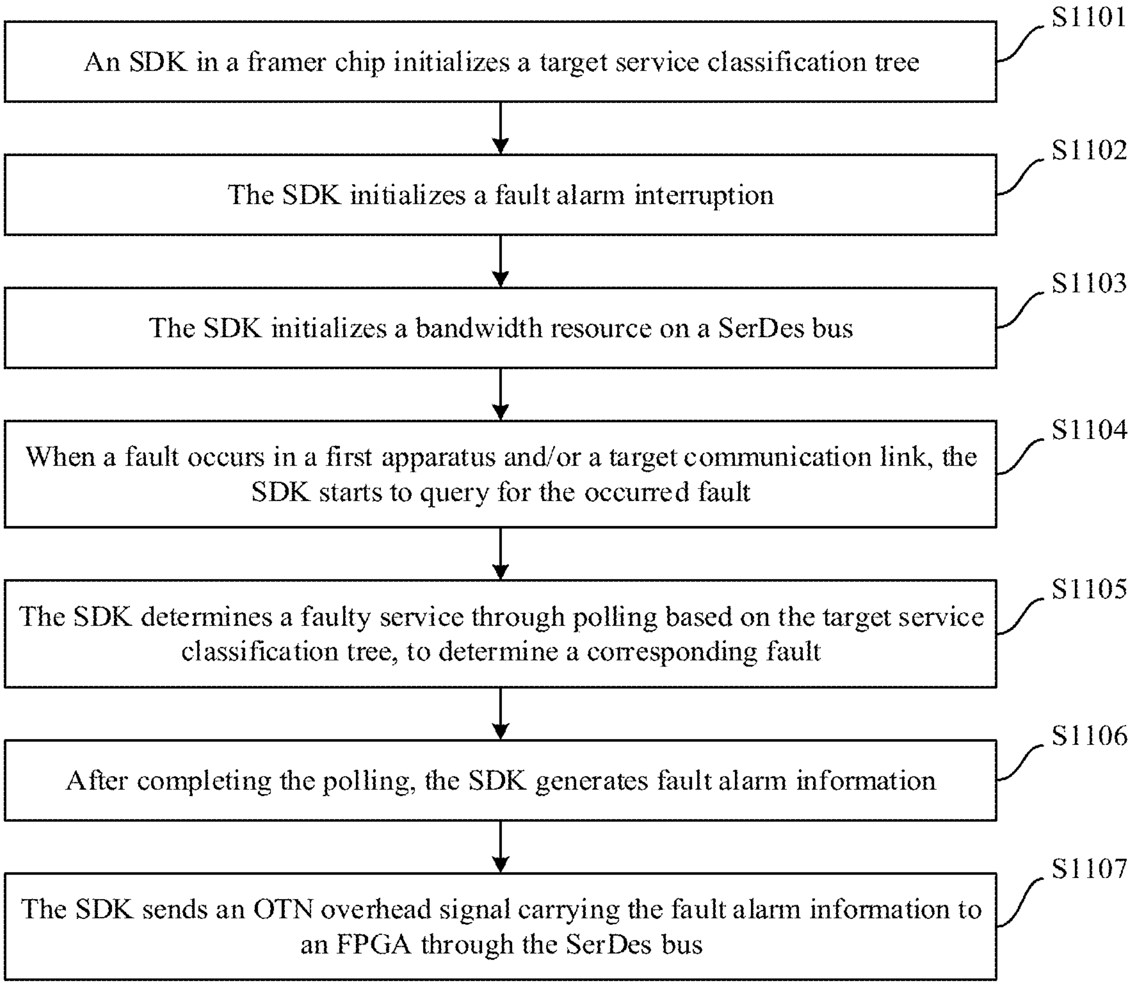
FIG. 11 is a schematic flowchart of a method for sending fault alarm information according to an embodiment of this disclosure.

FIG. 11 is a schematic flowchart of a method for sending fault alarm information according to an embodiment of this disclosure. For example, the method is used in the board shown in FIG. 4. As shown in FIG. 11, the procedure includes the following steps.

S1101: An SDK in a framer chip initializes a target service classification tree.

In this step, the SDK may determine, based on services carried by the first apparatus and the target communication link, service levels corresponding to these services, and establish an upper-level and lower-level association relationship between the services, to generate an initial target service classification tree.

S1102: The SDK initializes a fault alarm interruption.

S1103: The SDK initializes a bandwidth resource on the SerDes bus.

S1104: When a fault occurs in the first apparatus and/or the target communication link, the SDK starts to query for the occurred fault.

S1105: The SDK determines a faulty service through polling based on the target service classification tree, to determine a corresponding fault.

For an implementation used when the SDK determines, through polling and based on the target service classification tree, the faulty service, refer to the description in the foregoing embodiment. Details are not described herein again.

S1106: After completing the polling, the SDK generates the fault alarm information.

S1107: The SDK sends the OTN overhead signal carrying the fault alarm information to the FPGA through the SerDes bus.

For the fault alarm information and the data frame format of the OTN overhead signal, refer to the description in the foregoing embodiment. Details are not described herein again.

After receiving the fault alarm information from the SDK, the FPGA reports the fault alarm information to a related module. For example, the FPGA may report the fault alarm information to an SCC board.

Based on the foregoing embodiment, the DCO module may encode the fault alarm information by using a software encoding mode of the SDK in the framer chip, and send the fault alarm information by using idle physical resources of the existing SerDes bus. In this way, the fault alarm information is fast reported, and pin resources and layout area of the DCO module are saved. In addition, this solution is flexible in implementation, and a fault alarm of any one or more mapping layers can be fast reported.

Figure 12:
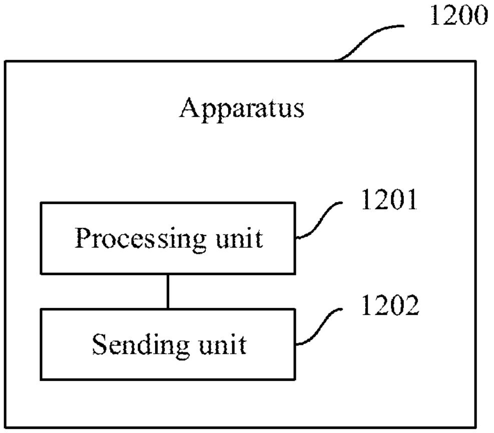
FIG. 12 is a schematic diagram of an apparatus according to an embodiment of this disclosure.

Based on the foregoing embodiments and a same concept, an embodiment of this disclosure further provides an apparatus. The apparatus is used in an optical module, and the optical module is located in a first apparatus. As shown in FIG. 12, the apparatus 1200 may include a processing unit 1201 configured to generate fault alarm information, and a sending unit 1202 configured to send the fault alarm information through a SerDes bus, where the fault alarm information indicates a fault that occurs in the first apparatus and/or a target communication link, and the target communication link is a link for communication between the first apparatus and another apparatus.

In a possible design, when sending the fault alarm information through the SerDes bus, the sending unit 1202 is further configured to send, through the SerDes bus, an OTN overhead signal that carries the fault alarm information.

In a possible design, the OTN overhead signal further includes overhead information and first identification information, or overhead information, first identification information, and second identification information. The overhead information is used to monitor a service signal of a service carried by the first apparatus and/or the target communication link, the first identification information identifies the fault alarm information, and the second identification information identifies the overhead information.

In a possible design, when generating the fault alarm information, the processing unit 1201 is further configured to determine the fault that occurs in the first apparatus and/or the target communication link, and generate the fault alarm information based on the determined fault, where a type of the fault alarm information is the same as a type of the determined fault.

In a possible design, when determining the fault that occurs in the first apparatus and/or the target communication link, the processing unit 1201 is further configured to obtain a target service classification tree, where the target service classification tree indicates a service level of each target service in a plurality of target services and an upper-level and lower-level association relationship between target services of different service levels, the plurality of target services are services carried by the first apparatus and the target communication link, and in the target service classification tree, each target service has one upper-level service and/or at least one lower-level service, detect a faulty service based on the target service classification tree, and determine, based on the faulty service, the fault that occurs in the first apparatus and/or the target communication link.

In a possible design, when detecting the faulty service based on the target service classification tree, the processing unit 1201 is further configured to select, from the target service classification tree, a target service with a highest service level as a to-be-detected service, sequentially detect, in descending order of service levels, the to-be-detected service and all target services that have a lower-level association relationship with the to-be-detected service, each time a faulty service is detected, save the faulty service, and stop detecting all target services that have a lower-level association relationship with the faulty service, and after detection of all the target services that have the lower-level association relationship with the to-be-detected service is completed, select, from the target service classification tree, a next target service with a highest service level as a to-be-detected service to continue detection until detection of the last target service with a highest service level is completed.

In a possible design, when a faulty service is a target service, the fault alarm information includes at least one piece of fault indication information. The at least one piece of fault indication information indicates the target service.

In an implementation, the processing unit 1201 may be a processor or a controller, for example, a general-purpose central processing unit (CPU), a general-purpose processor, a DSP, an application-specific integrated circuit (ASIC), an FPGA, another programmable logic device, a transistor logic device, a hardware component, or any combination thereof. The processor may implement or execute various example logical blocks, modules, or the like described with reference to content disclosed in this disclosure. Alternatively, the processor may be a combination of processors implementing a computing function, for example, a combination of one or more microprocessors, or a combination of a DSP and a microprocessor.

The sending unit 1202 may be an interface circuit of the apparatus 1200, and is configured to send a signal or data to another apparatus. When the apparatus 1200 is implemented in a manner of a chip, the sending unit 1202 may be an interface circuit configured by the chip to send data to another chip or apparatus. Optionally, the sending unit 1202 may further integrate a function of a receiving unit. That is, the sending unit 1202 may further receive a signal or data from another apparatus.

In embodiments of this disclosure, division into the units is an example, is merely logical function division, and may be other division during actual implementation. In addition, functional units in embodiments of this disclosure may be integrated into one processor, or each of the units may exist alone physically, or two or more units may be integrated into one unit. The integrated unit may be implemented in a form of hardware, or may be implemented in a form of a software functional unit.

Only one or more of the units in FIG. 12 may be implemented by software, hardware, firmware, or a combination thereof. The software or firmware includes but is not limited to computer program instructions or code, and may be executed by a hardware processor. The hardware includes but is not limited to various integrated circuits, for example, a CPU, a DSP, an FPGA, or an ASIC.

Figure 13:
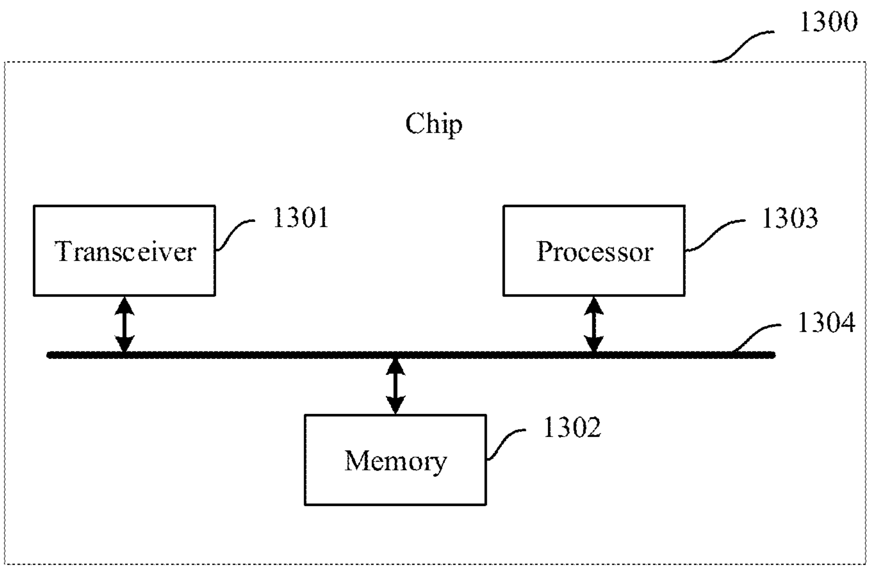
FIG. 13 is a schematic diagram of a structure of an apparatus according to an embodiment of this disclosure.

Based on the foregoing embodiments and a same concept, an embodiment of this disclosure further provides a chip. The chip is configured to implement the method for sending fault alarm information provided in embodiments of this disclosure. As shown in FIG. 13, the chip 1300 includes a transceiver 1301, a memory 1302, and at least one processor 1303.

The processor 1303 and the transceiver 1301 are coupled to each other. In this embodiment of this disclosure, the coupling is an indirect coupling or a communication connection between apparatuses, units, or modules, may be in an electrical form, a mechanical form, or another form, and is used for information exchange between the apparatuses, units, or modules.

Further, the transceiver 1301 may be a circuit, a bus, a communication interface, or any other module that may be configured to perform information exchange, and may be configured to receive or send information.

Optionally, the memory 1302 is coupled to the transceiver 1301 and the processor 1303, and is configured to store program instructions.

The processor 1303 is configured to invoke the program instructions stored in the memory 1302, so that the chip 1300 performs the method provided in embodiments of this disclosure.

The transceiver 1301 is configured to receive and send a radio frequency signal, and is coupled to a receiver and a transmitter of the chip 1300. The transceiver 1301 communicates with a communication network and another communication device by using a radio frequency signal or an optical signal, for example, an ethernet, a radio access network (RAN), a wireless local area network (WLAN), an OTN, or the like. During specific implementation, a communication protocol supported by the transceiver 1301 may include an OTN protocol, a wireless communication network protocol, and the like. The wireless communication network protocol may be, for example, a WI-FI protocol, second generation (2G)/third generation (3G), Long-Term Evolution (LTE), fifth generation (5G) New Radio (NR), or the like.

During specific implementation, the memory 1302 may include a high-speed random access memory, and may also include a non-volatile memory, such as one or more disk storage devices, a flash memory device, or another non-volatile solid-state storage device. The memory 1302 may store an operating system (or a system below), for example, an embedded operating system such as ANDROID, IOS, WINDOWS, LINUX, or the like. The memory 1302 may be configured to store an implementation program in this embodiment of this disclosure. The memory 1302 may further store a network communication program. The network communication program may be used to communicate with one or more additional devices, one or more user equipments, or one or more network devices.

The processor 1303 may be a general-purpose CPU, a microprocessor, an ASIC, or one or more integrated circuits configured to control execution of programs of the solutions of this disclosure.

In some embodiments of this disclosure, the transceiver 1301, the memory 1302, and the processor 1303 may be connected to each other through a communication line 1304. The communication line 1304 may be a Peripheral Component Interconnect (PCI) bus, an Extended Industry Standard Architecture (EISA) bus, or the like. The communication line 1304 may be classified into an address bus, a data bus, a control bus, and the like. For ease of representation, only one bold line represents the bus in FIG. 13, but this does not mean that there is only one bus or only one type of bus.

It should be noted that FIG. 13 is merely an implementation of this embodiment of this disclosure. During actual application, the chip 1300 may further include more or fewer components. This is not limited herein.

Based on the foregoing embodiments and a same concept, an embodiment of this disclosure further provides an electronic device. The electronic device includes the chip in the foregoing embodiments.

Based on the foregoing embodiments and a same concept, an embodiment of this disclosure further provides an electronic device. The electronic device includes an optical module, and the optical module includes the chip in the foregoing embodiments.

Based on the foregoing embodiments and a same concept, an embodiment of this disclosure further provides a computer-readable storage medium. The computer-readable storage medium stores a computer program. When the computer program is run on a computer, the computer is enabled to perform the method provided in the foregoing embodiments.

Based on the foregoing embodiments and a same concept, an embodiment of this disclosure further provides a computer program product. The computer program product includes a computer program or instructions. When the computer program or the instructions are run on a computer, the computer is enabled to perform the method provided in the foregoing embodiments.

All or some of the methods in embodiments of this disclosure may be implemented by using software, hardware, firmware, or any combination thereof. When software is used to implement the methods, all or some of the methods may be implemented in a form of a computer program product. The computer program product includes one or more computer instructions. When the computer instructions are loaded and executed on a computer, the procedure or functions according to embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device integrating one or more usable media, such as a server or a data center. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

It is clearly that, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A method comprising:

obtaining a target service classification tree for first target services carried by an apparatus and a target communication link;

detecting, based on the target service classification tree, a first faulty service;

generating, based on the first faulty service, fault alarm information comprising a data frame, wherein the data frame comprises a mapping layer field that indicates a mapping layer to which a faulty service belongs, a section layer field that indicates a section layer to which the faulty service belongs, and a fault indication information field that indicates whether a specific service is faulty, wherein the fault alarm information indicates a fault that occurs in the apparatus or the target communication link, and wherein the target communication link is for communication by the apparatus; and sending, through a serializer/deserializer (SerDes) bus, the fault alarm information.

2. The method of claim 1, wherein sending the fault alarm information comprises sending, through the SerDes bus, an optical transport network (OTN) overhead signal that carries the fault alarm information.

3. The method of claim 2, wherein the OTN overhead signal further comprises overhead information and first identification information, wherein the overhead information is for monitoring a service signal of a service carried by the apparatus or the target communication link, and wherein the first identification information identifies the fault alarm information.

4. The method of claim 1, further comprising generating the fault alarm information based on a fault that occurs in the apparatus or the target communication link, wherein the fault alarm information comprises a type of fault.

5. The method of claim 2, wherein the target service classification tree indicates a service level of each of first target services and an upper-level and lower-level association relationship among second target services of different service levels, wherein in the target service classification tree, each of the first target services has one upper-level service or at least one lower-level service, and wherein the OTN overhead signal further comprises overhead information, first identification information, and second identification information, wherein the second identification information identifies the overhead information.

6. The method of claim 5, wherein detecting the first faulty service comprises:

selecting, from the target service classification tree, a third target service with a first highest service level as a first to-be-detected service;

sequentially detecting, in a descending order of service levels, the first to-be-detected service and all fourth target services that have a first lower-level association relationship with the first to-be-detected service;

each time a second faulty service is detected:

saving the second faulty service; and stopping detecting all fifth target services that have a second lower-level association relationship with the second faulty service; and selecting, from the target service classification tree after detecting all the fourth target services, a next target service with a second highest service level as a second to-be-detected service to continue detection until detecting a last target service with a third highest service level.

7. The method of claim 5, wherein the first faulty service is a third target service, and wherein the fault alarm information comprises at least one piece of fault indication information indicating the third target service.

8. An apparatus, comprising:

at least one processor configured to:

obtain a target service classification tree for first target services carried by an apparatus and a target communication link;

detect, based on the target service classification tree, a first faulty service;

generate, based on the first faulty service, fault alarm information comprising a data frame, wherein the data frame comprises a mapping layer field that indicates a mapping layer to which a faulty service belongs, a section layer field that indicates a section layer to which the faulty service belongs, and a fault indication information field that indicates whether a specific service is faulty, wherein the fault alarm information indicates a fault that occurs in the apparatus or the target communication link, and wherein the target communication link is for communication; and a transmitter coupled to the at least one processor and configured to send, through a serializer/deserializer (SerDes) bus, the fault alarm information.

9. The apparatus of claim 8, wherein the transmitter is further configured to send, through the SerDes bus, an optical transport network (OTN) overhead signal that carries the fault alarm information.

10. The apparatus of claim 9, wherein the OTN overhead signal further comprises overhead information and first identification information, wherein the overhead information is for monitoring a service signal of a service carried by the apparatus or the target communication link, and wherein the first identification information identifies the fault alarm information.

11. The apparatus of claim 8, wherein the at least one processor is further configured to generate the fault alarm information based on a fault that occurs in the apparatus or the target communication link, wherein the fault alarm information comprises a type of fault.

12. The apparatus of claim 9, wherein the target service classification tree indicates a service level of each of first target services and an upper-level and lower-level association relationship among second target services of different service levels, wherein, in the target service classification tree, each of the first target services has one upper-level service or at least one lower-level service, and wherein the OTN overhead signal further comprises overhead information, first identification information, and second identification information, wherein the second identification information identifies the overhead information.

13. The apparatus of claim 12, wherein the processor is further configured to:

select, from the target service classification tree, a third target service with a first highest service level as a first to-be-detected service;

sequentially detect, in a descending order of service levels, the first to-be-detected service and all fourth target services that have a first lower-level association relationship with the first to-be-detected service;

each time a second faulty service is detected:

save the second faulty service; and stop detecting all fifth target services that have a second lower-level association relationship with the second faulty service; and select, from the target service classification tree after detection of all the fourth target services, a next target service with a second highest service level as a second to-be-detected service to continue detection until detecting a last target service with a third highest service level.

14. The apparatus of claim 12, wherein the first faulty service is a third target service, and wherein the fault alarm information comprises at least one piece of fault indication information indicating the third target service.

15. A computer program product comprising instructions stored on a non-transitory medium and that, when executed by one or more processors, cause an apparatus to:

obtain a target service classification tree for first target services carried by an apparatus and a target communication link;

detect, based on the target service classification tree, a first faulty service;

generate, based on the first faulty service, fault alarm information comprising a data frame, wherein the data frame comprises a mapping layer field that indicates a mapping layer to which a faulty service belongs, a section layer field that indicates a section layer to which the faulty service belongs, and a fault indication information field that indicates whether a specific service is faulty, wherein the fault alarm information indicates a fault that occurs in the apparatus of the target communication link, and wherein the target communication link is for communication; and send, through a serializer/deserializer (SerDes) bus, the fault alarm information.

16. The computer program product of claim 15, wherein sending the fault alarm information comprises sending, through the SerDes bus, an optical transport network (OTN) overhead signal that carries the fault alarm information.

17. The computer program product of claim 16, wherein the OTN overhead signal further comprises overhead information and first identification information, wherein the overhead information is for monitoring a service signal of a service carried by the apparatus or the target communication link, and wherein the first identification information identifies the fault alarm information.

18. The computer program product of claim 16, wherein instructions further cause the apparatus to generate the fault alarm information based on a fault that occurs in the apparatus or the target communication link, wherein the fault alarm information comprises a type of fault.

19. The computer program product of claim 16, wherein the target service classification tree indicates a service level of each of first target services and an upper-level and lower-level association relationship among second target services of different service levels, wherein, in the target service classification tree, each of the first target services has one upper-level service or at least one lower-level service, and wherein the OTN overhead signal further comprises overhead information, first identification information, and second identification information, wherein the second identification information identifies the overhead information.

20. The computer program product of claim 18, wherein instructions further cause the apparatus to:

select, from the target service classification tree, a third target service with a first highest service level as a first to-be-detected service;

sequentially detect, in a descending order of service levels, the first to-be-detected service and all fourth target services that have a first lower-level association relationship with the first to-be-detected service;

each time a second faulty service is detected:

save the second faulty service; and stop detecting all fifth target services that have a second lower-level association relationship with the second faulty service; and select, from the target service classification tree after detecting all the fourth target services, a next target service with a second highest service level as a second to-be-detected service to continue detection until detecting a last target service with a third highest service level.

* * * * *